DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 6

T941,005
AUTOMATED BLOCK DIAGRAMMING SYSTEM
Jean Davies Lesser, Yorktown Heights, N.Y., assignor to International Business Machines Corporation, Armonk, N.Y.
Filed Aug. 20, 1974, Ser. No. 499,109
Int. Cl. G06f *9/12*
U.S. Cl. 444—1
21 Sheets Drawing. 37 Pages Specification

INTEGRATED ABD ALGORITHM

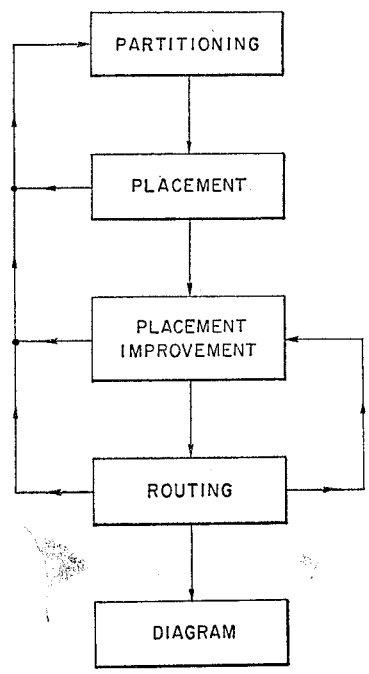

This is a system for accepting the specification of the elements of a block graph which are introduced as input to a computer system and automatically producing paginated block diagrams as output. A set of heuristic procedures are used in this system, which results in an integrated, interactive relationship between the partitioning, placement and line routing functions.

INTEGRATED ABD ALGORITHM

COLUMN 1—
INITIAL PLACEMENT

COLUMN 1—
READJUSTED PLACEMENT

INITIAL PLACEMENT

PLACEMENT AFTER
EVALUATION

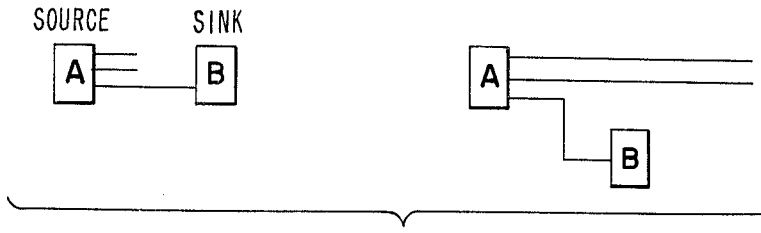
FIG. 5A SHIFT TO ALLOW EXTERNAL OUTPUTS TO EXIT
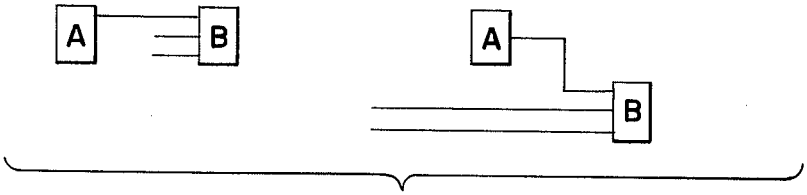
FIG. 5B SHIFT TO ALLOW EXTERNAL INPUTS TO ENTER
FIG. 6A
AREA TO BE EVALUATED
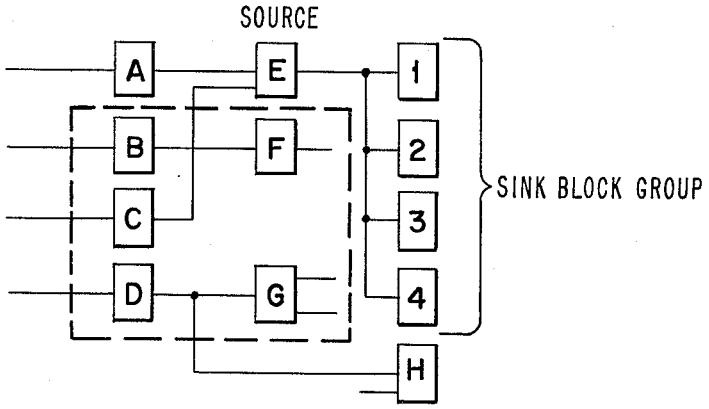
FIG. 6B
AFTER MOVE OF INDEPENDENT STRING
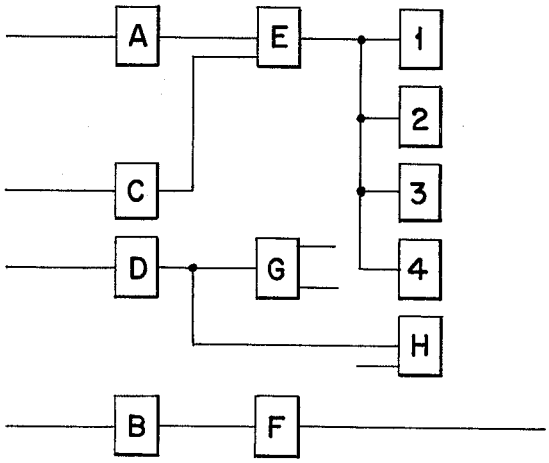

AREAS TO BE SHIFTED DOWN

RESULT OF SHIFT

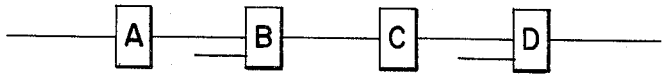
FIG. 8A RESULT OF INITIAL PLACEMENT
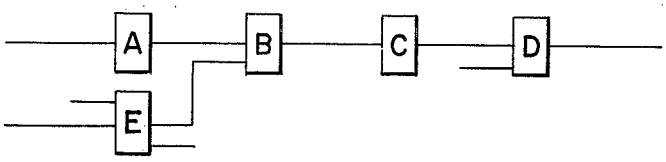
FIG. 8B PICK UP SOURCE BLOCK
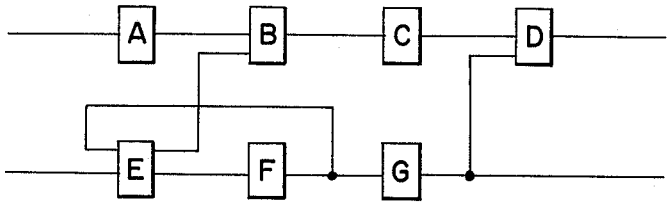
FIG. 8C COMPLETE LAYOUT
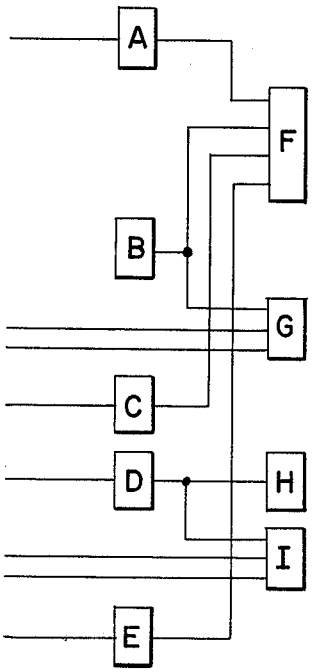
FIG. 9A BEFORE
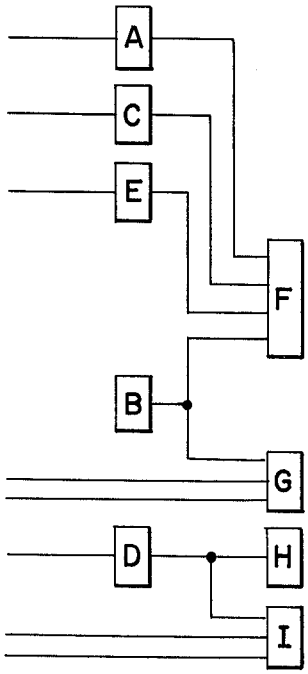
FIG. 9B AFTER

BEFORE

AFTER

ORIGINAL NET POSITIONS

REASSIGNED NET POSITIONS

ORIGINAL NET POSITIONS

REASSIGNED NET POSITIONS

ORIGINAL NET POSITIONS

REASSIGNED NET POSITIONS

BEFORE SHIFT

AFTER SHIFT

BEFORE SINK BLOCK GROUP EVALUATION

AFTER EVALUATION

AFTER ROW COMPRESSION

BEFORE COLUMN COMPRESSION

AFTER COMPRESSION

Figure 1:
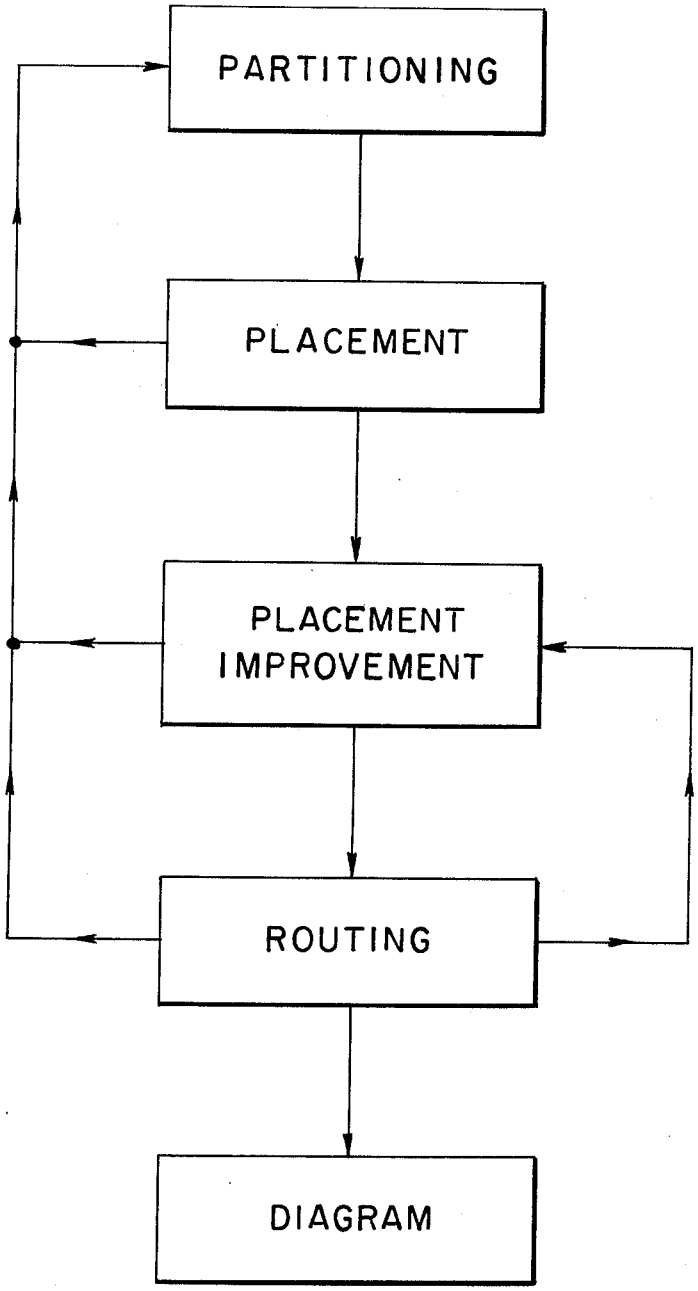
Figure 2A:
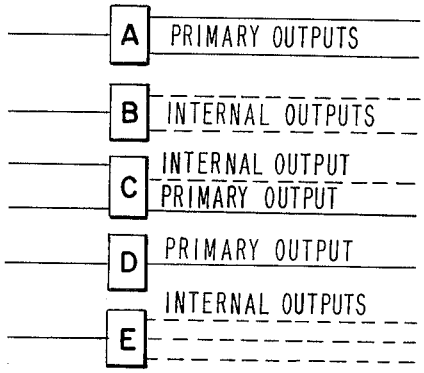
Figure 2B:
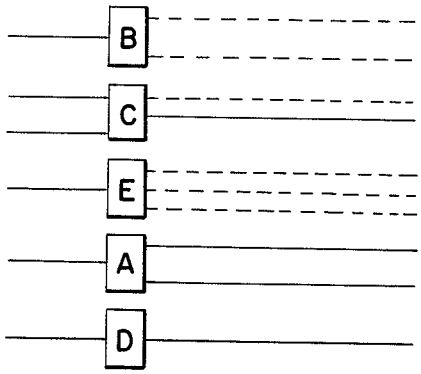
Figure 4A:
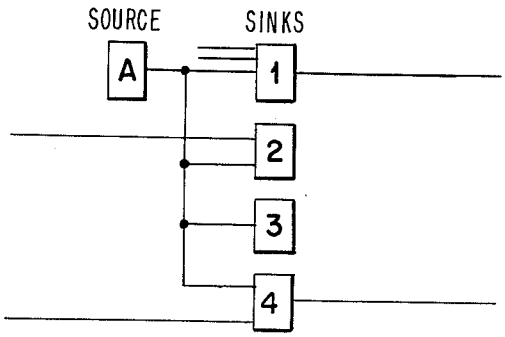
Figure 4B:
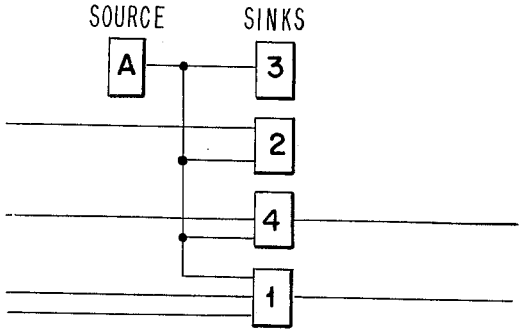
Figure 3A:
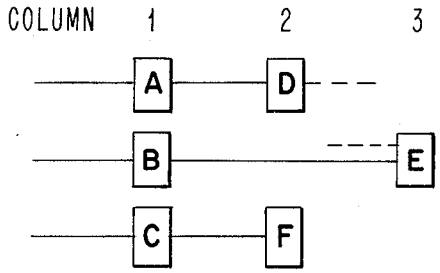
Figure 3B:
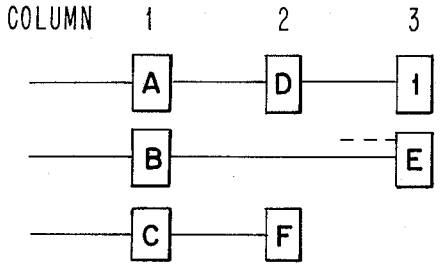
Figure 3C:
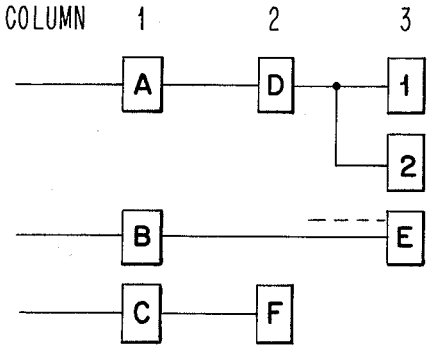
Figure 3D:
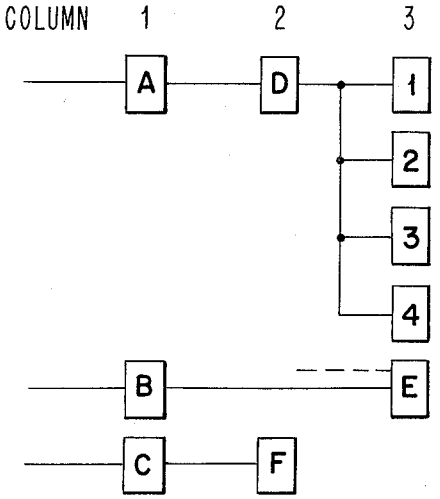
Figure 7A:
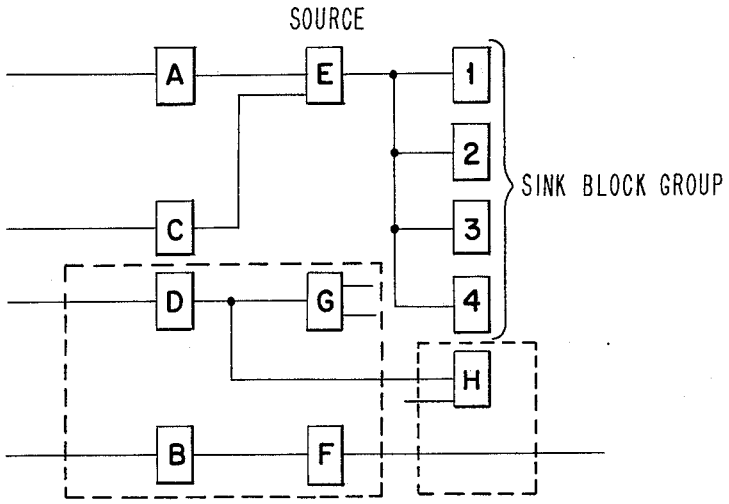
Figure 7B:
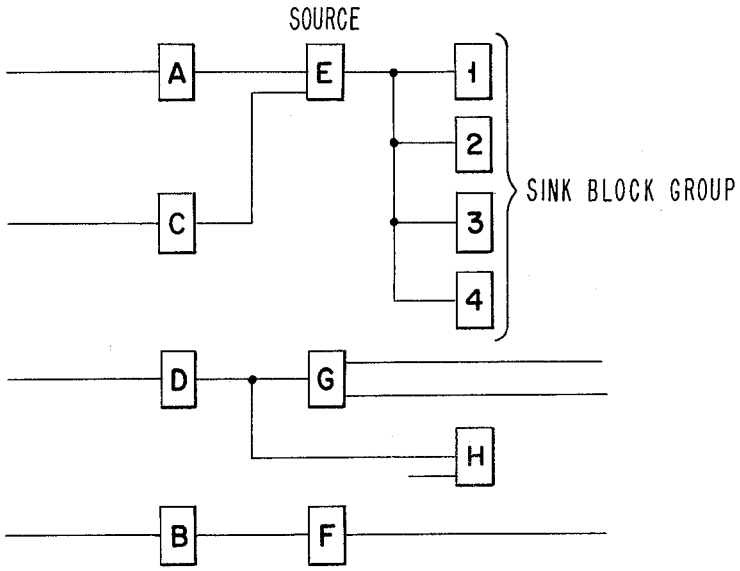
Figure 10A:
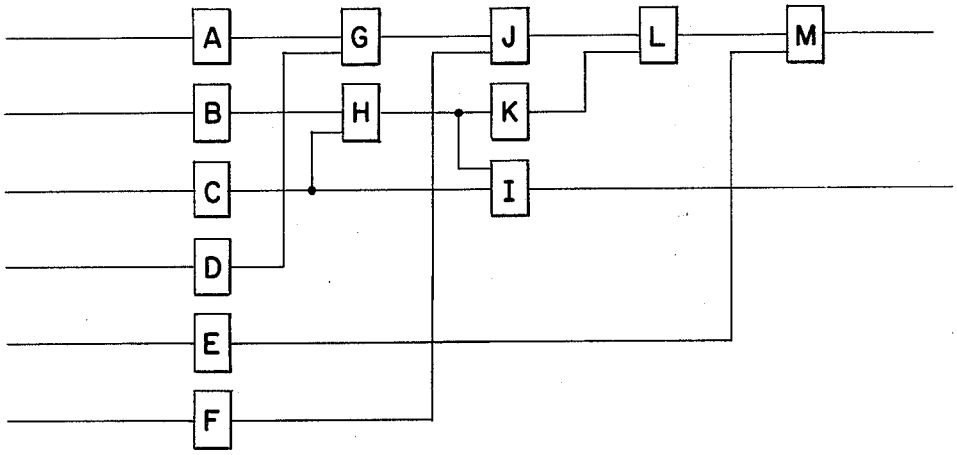
Figure 10B:
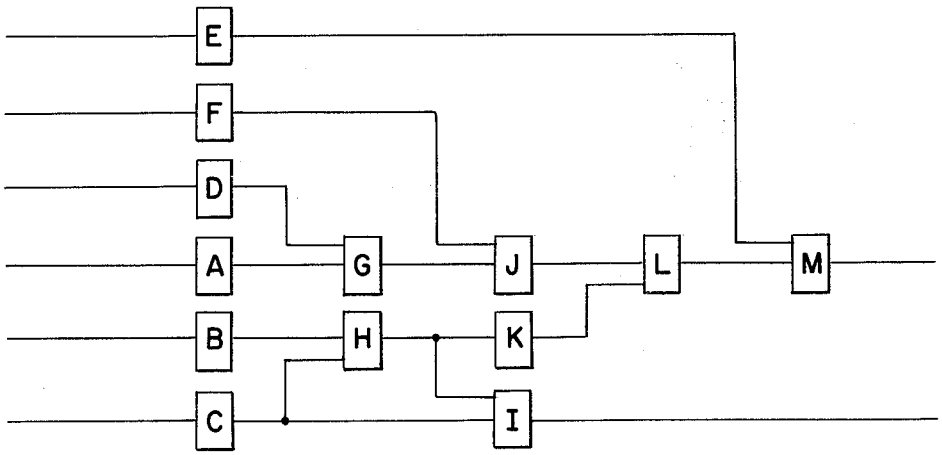
Figure 11A:
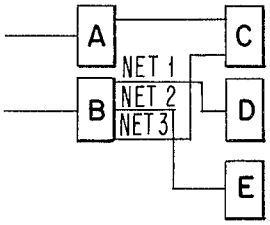
Figure 11B:
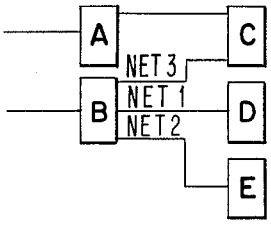
Figure 12A:
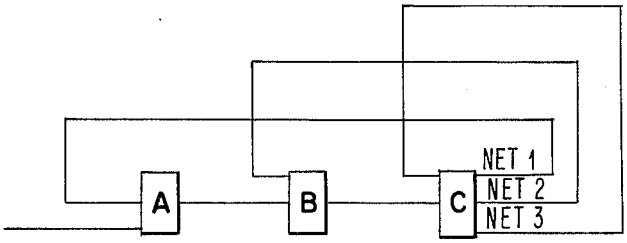
Figure 12B:
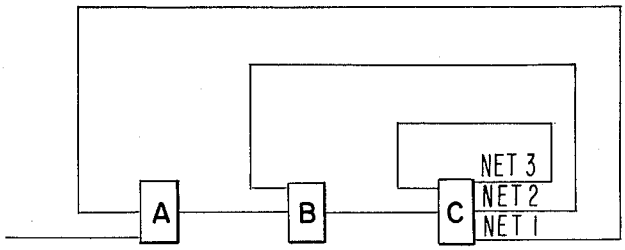
Figure 13A:
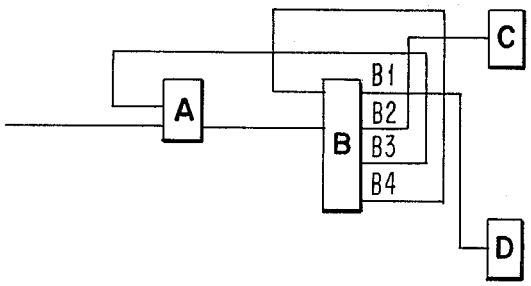
Figure 13B:
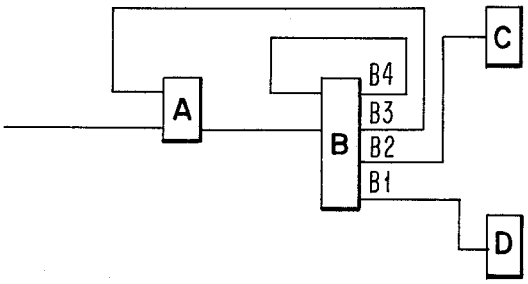
Figure 14A:
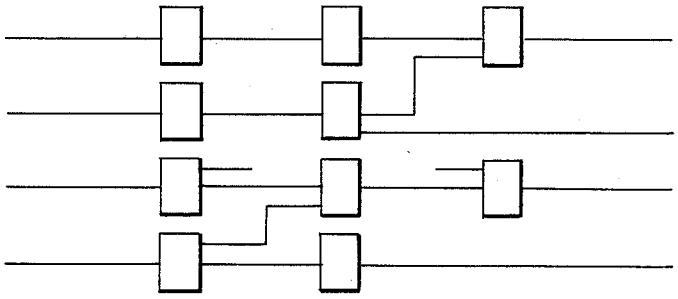
Figure 14B:
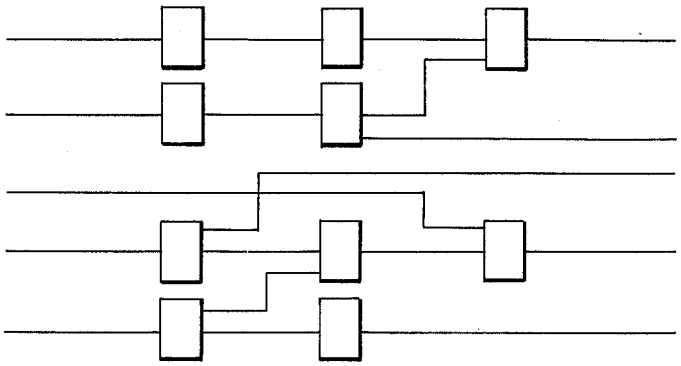
Figure 15A:
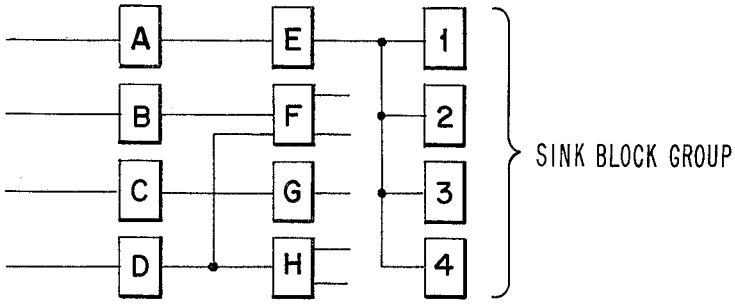
Figure 15B:
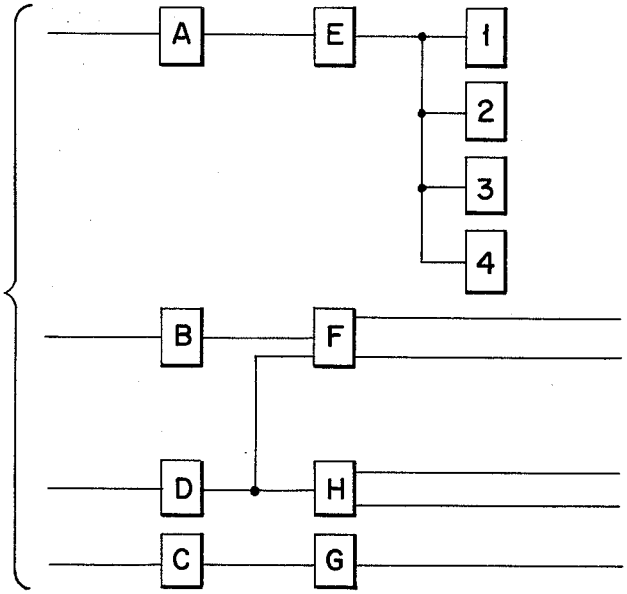
Figure 15C:
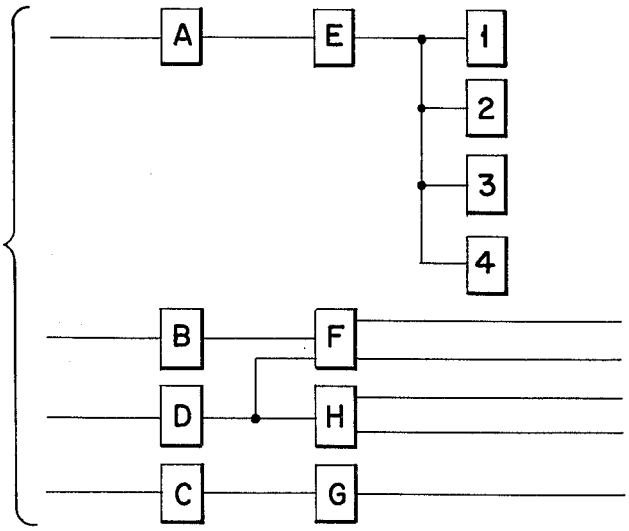
Figure 16A:
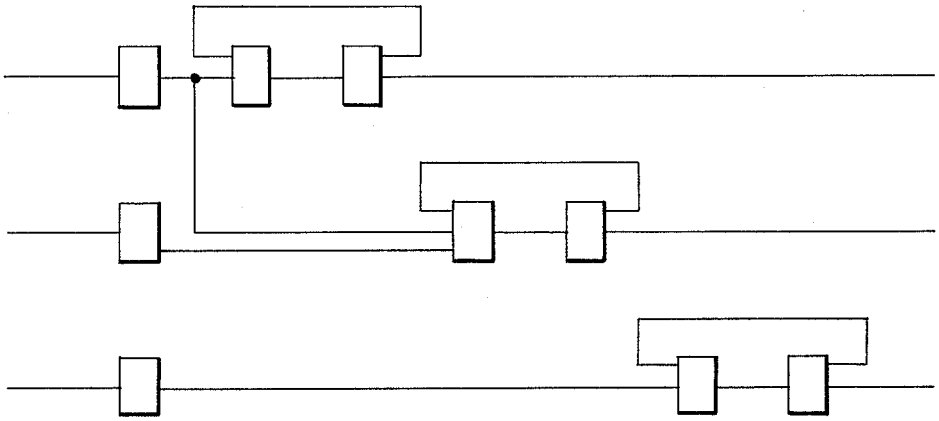
Figure 16B:
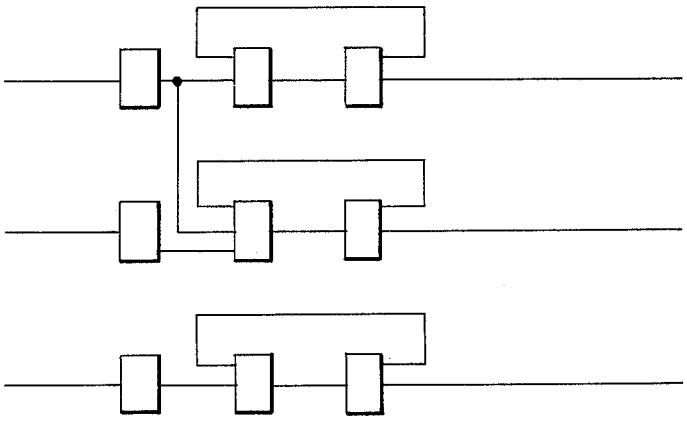
Figure 20A:
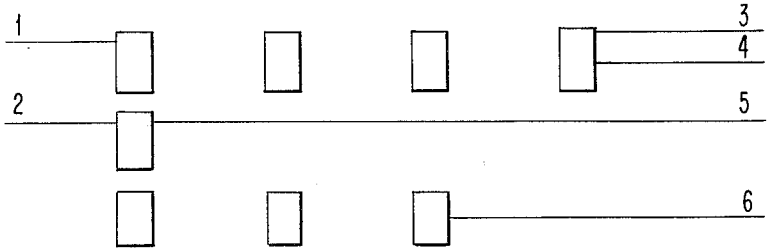
Figure 20B:
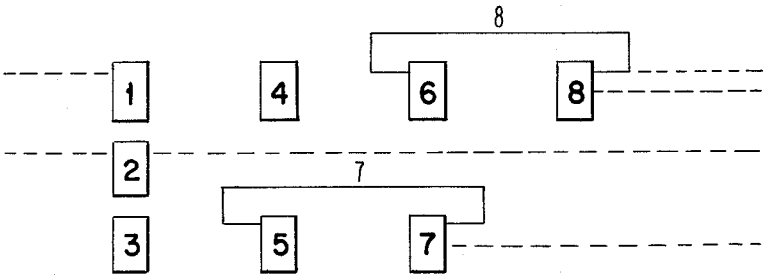
Figure 20C:
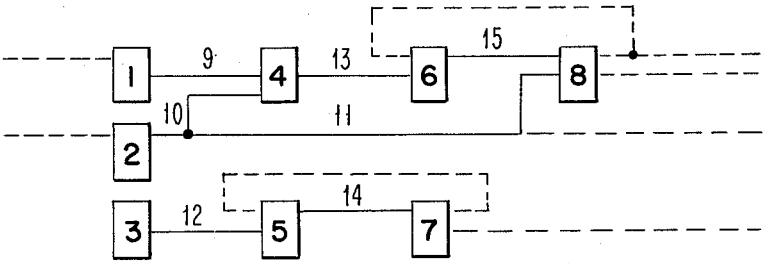
Figure 20D:
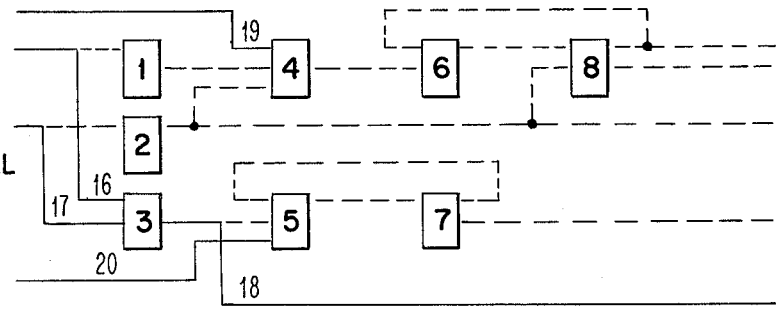
Figures 22, 22A, 22B, 22C, 22D, 22E, 22F:
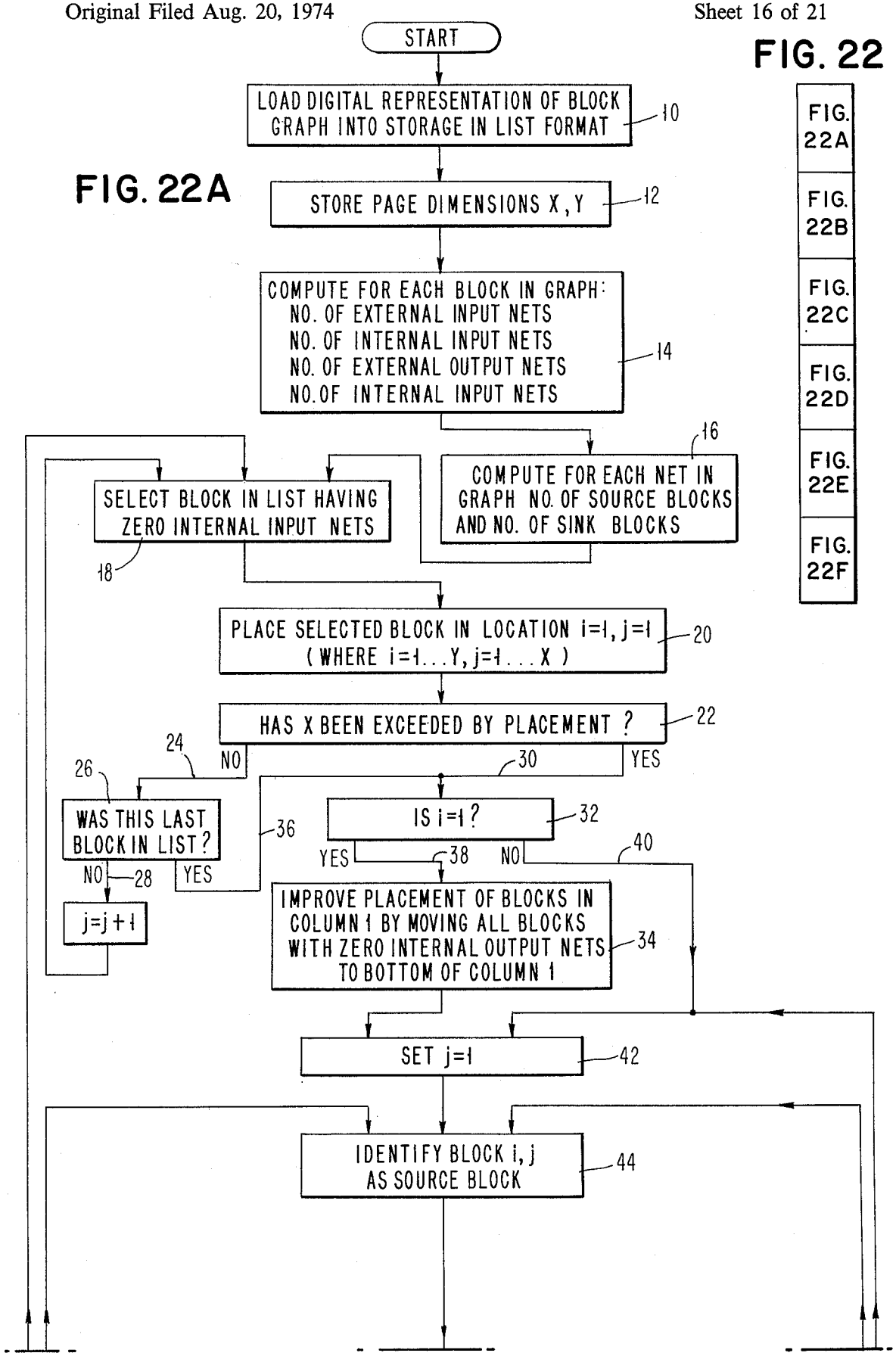
Figure 22B:
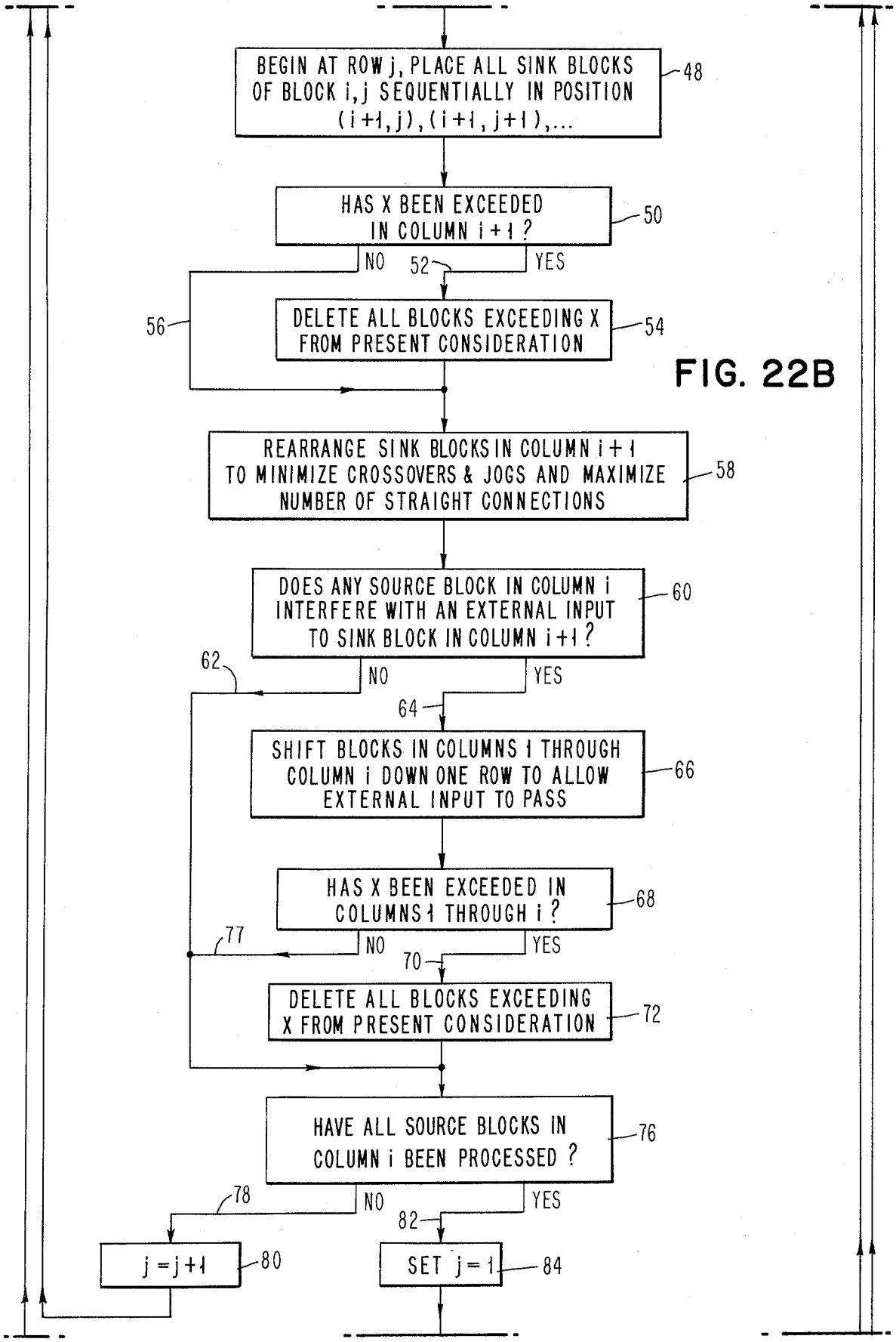
Figure 22C:
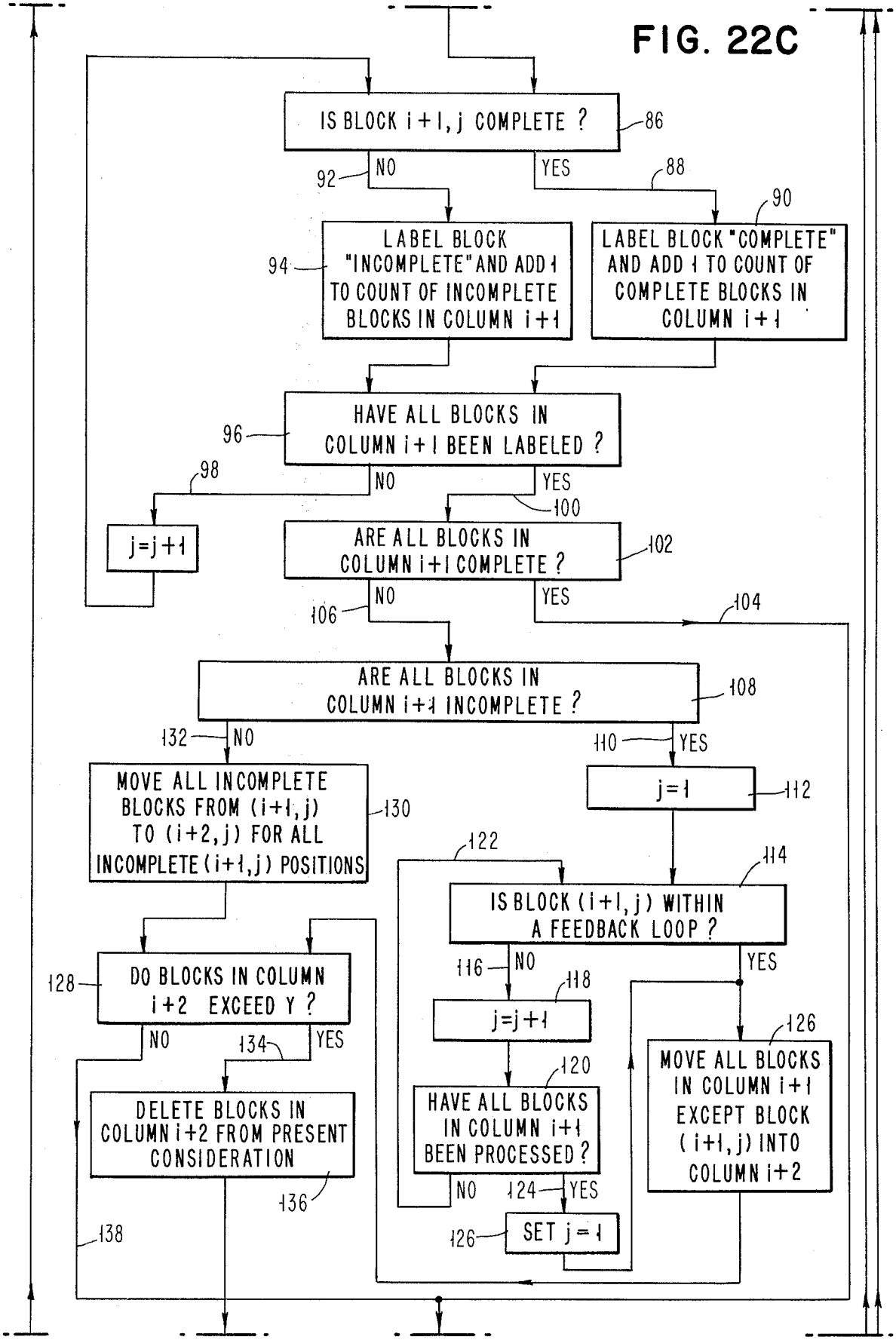
Figure 22D:
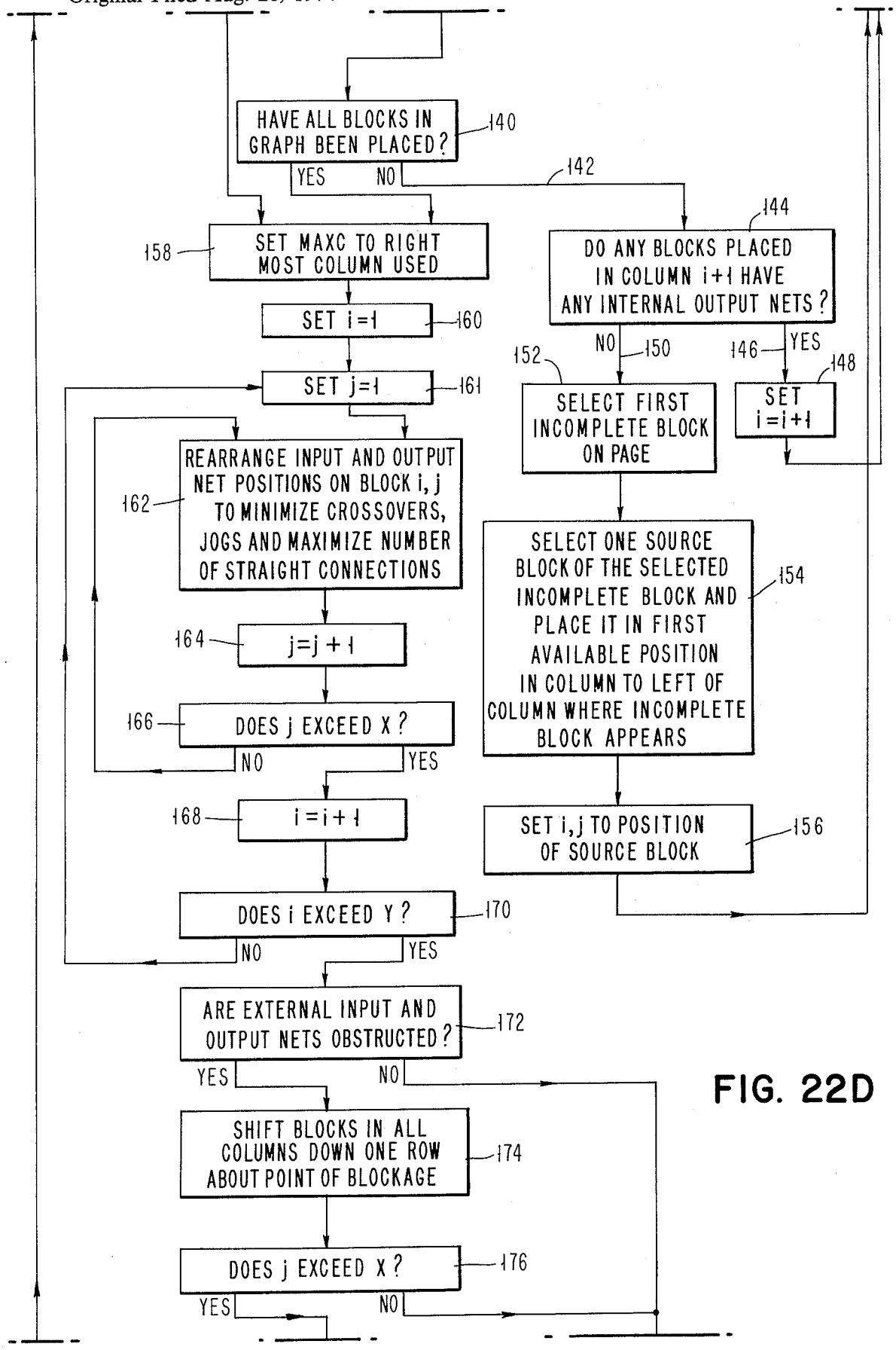
Figure 22E:
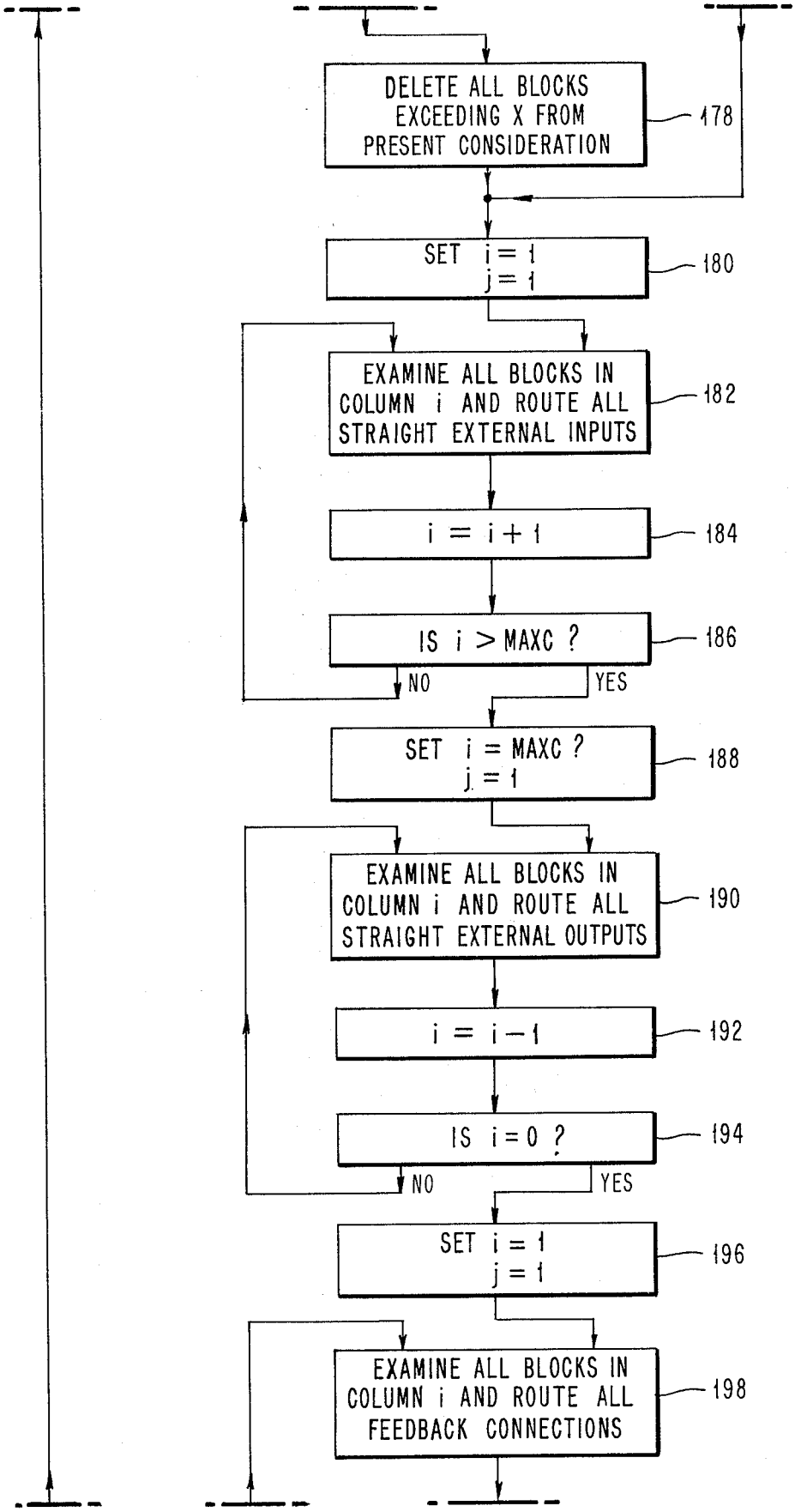
Figure 22F:
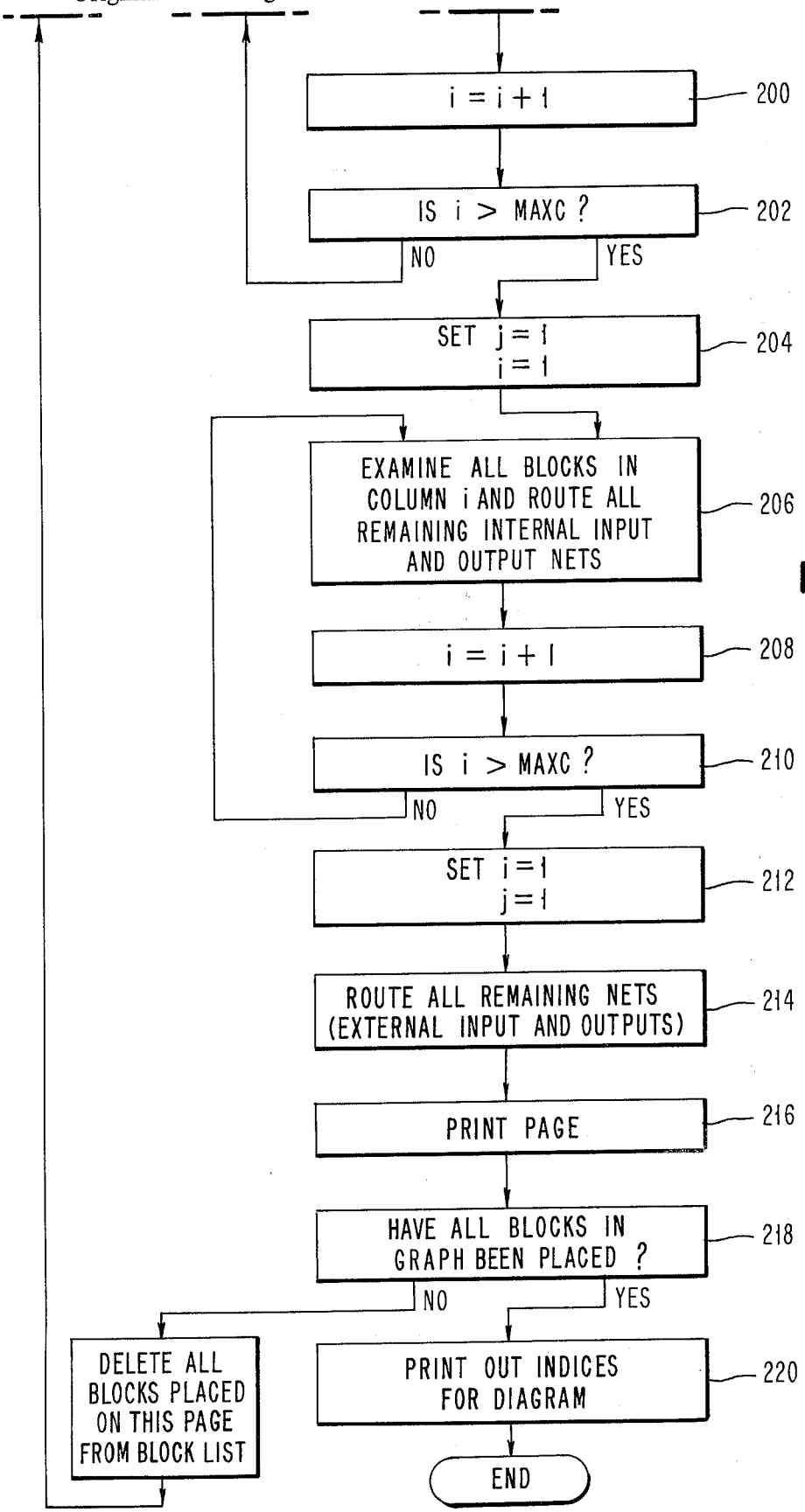

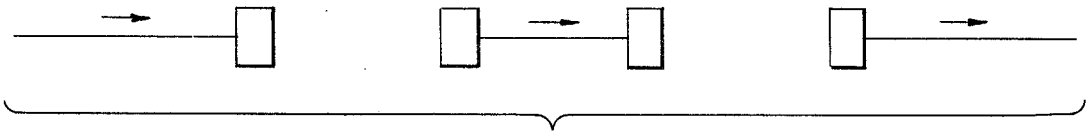
FIG. 17A 1-TRACK CONNECTIONS
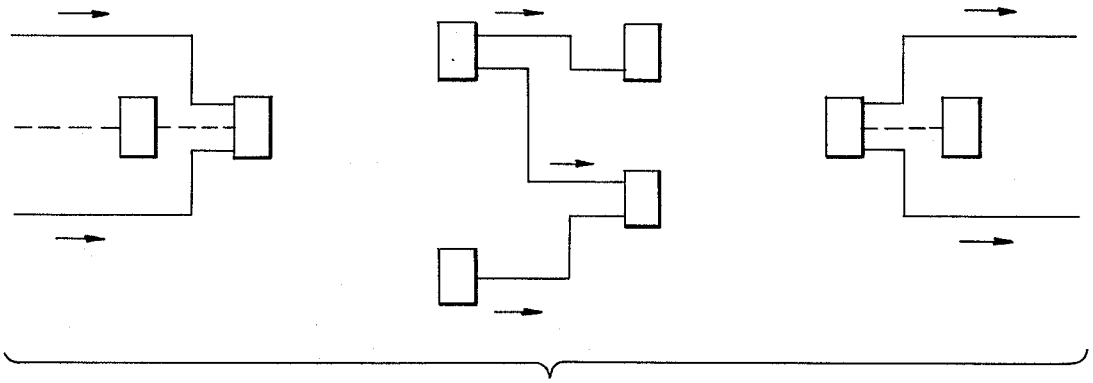
FIG. 17B 3-TRACK CONNECTIONS
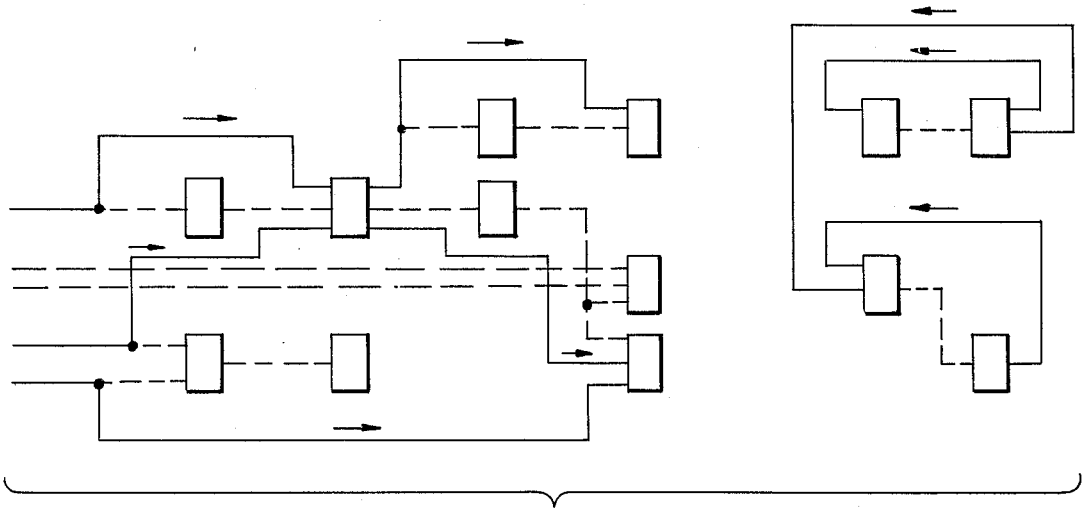
FIG. 17C 5-TRACK CONNECTIONS

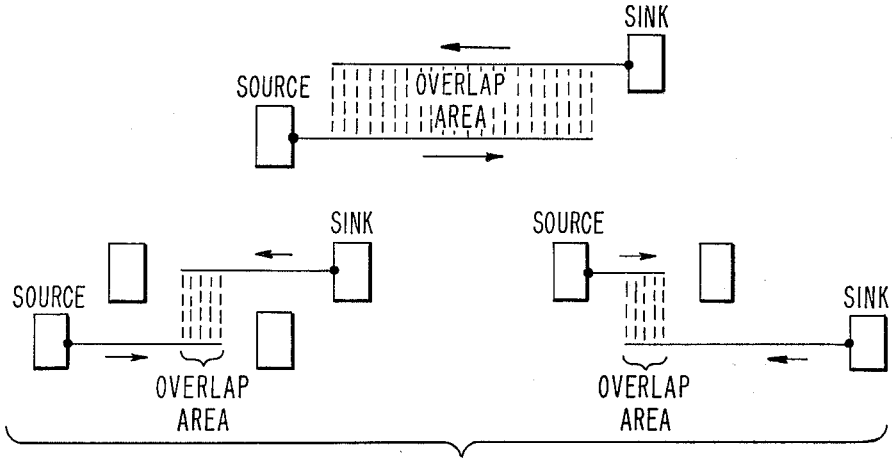
FIG. 18 ROUTING OF 3-TRACK CONNECTIONS
FIG. 19A
FIND HORIZONTAL TRACKS ABOVE AND BELOW SOURCE BLOCK
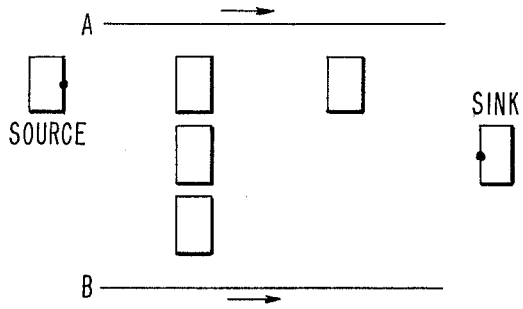
FIG. 19B
FIND VERTICAL TRACKS IN OVERLAP AREA
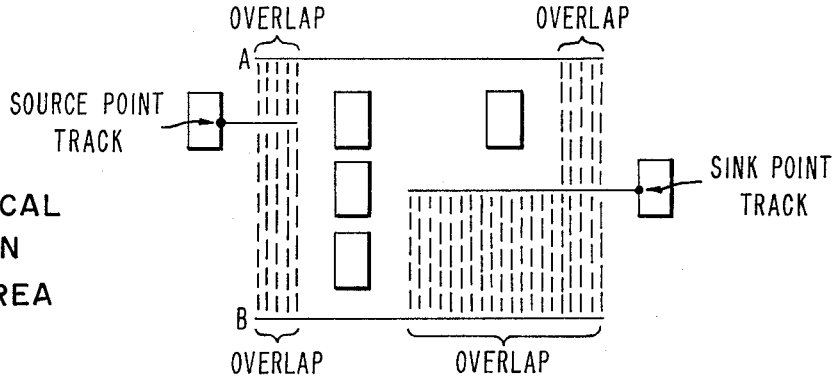
FIG. 19C
CHOOSE SHORTER OF TWO PATHS
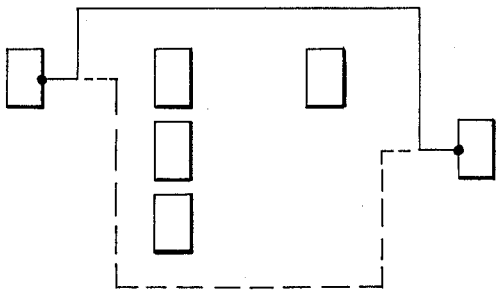

PASS 1 -1-TRACK EXTERNAL INPUTS AND OUTPUTS

PASS 2 – ALL FEEDBACKS

PASS 3 – ALL OTHERS EXCEPT REMAINING EXTERNAL I/O's

PASS 4 -ALL REMAINING EXTERNAL I/O's

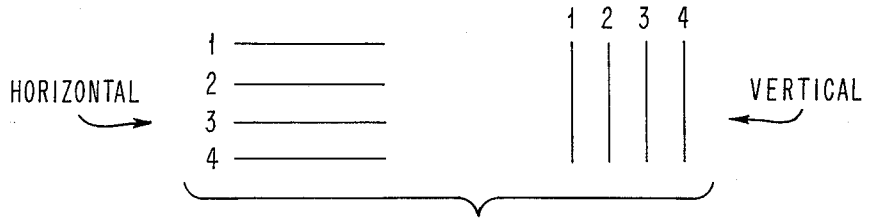
FIG. 21A NUMBERING OF TRACKS WITHIN CHANNEL
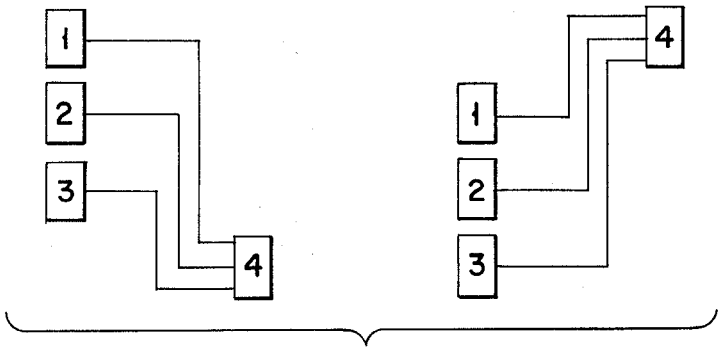
FIG. 21B VERTICAL NESTING
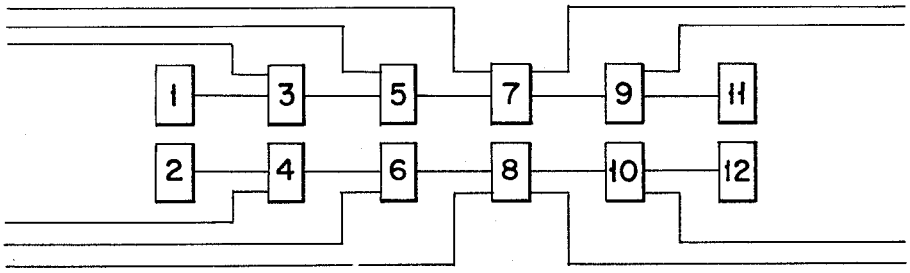
FIG. 21C HORIZONTAL NESTING
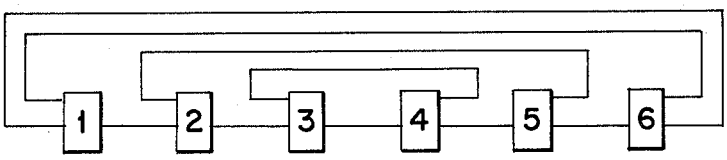
FIG. 21D FEEDBACK NESTING